Feb. 10, 1942. J. W. OVERBEKE 2,272,725
CONTROL OF AIRCRAFT SURFACES
Filed July 13, 1939 2 Sheets-Sheet 2
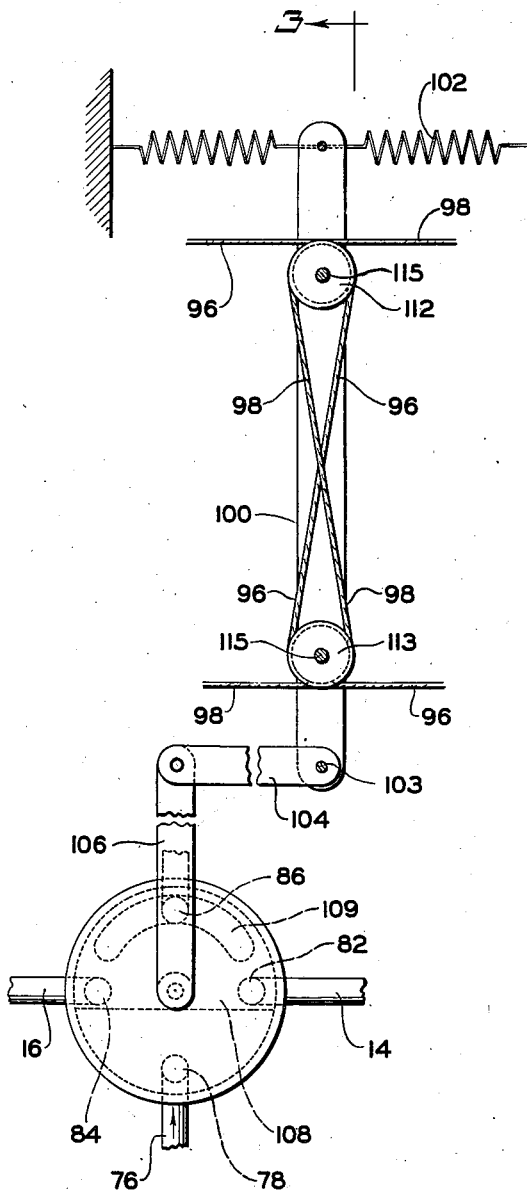
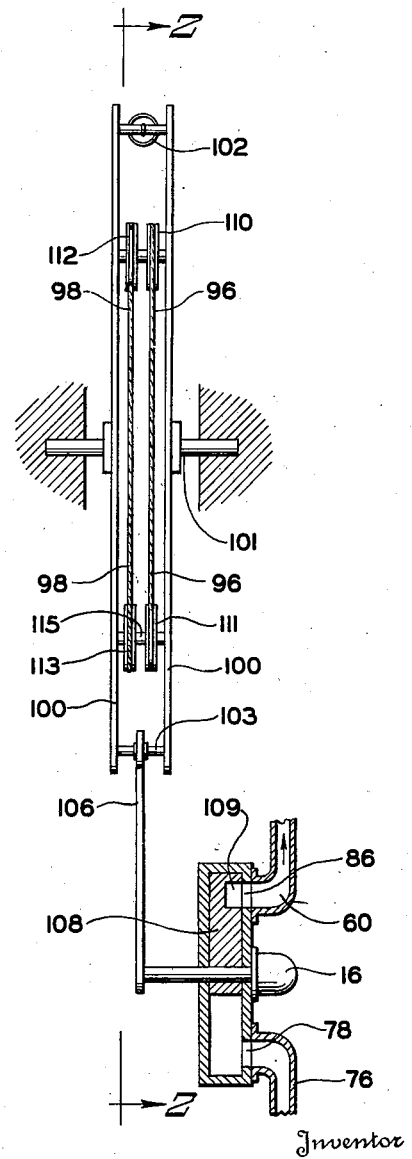
Inventor
JOHN W. OVERBEKE Patented Feb. 10, 1942

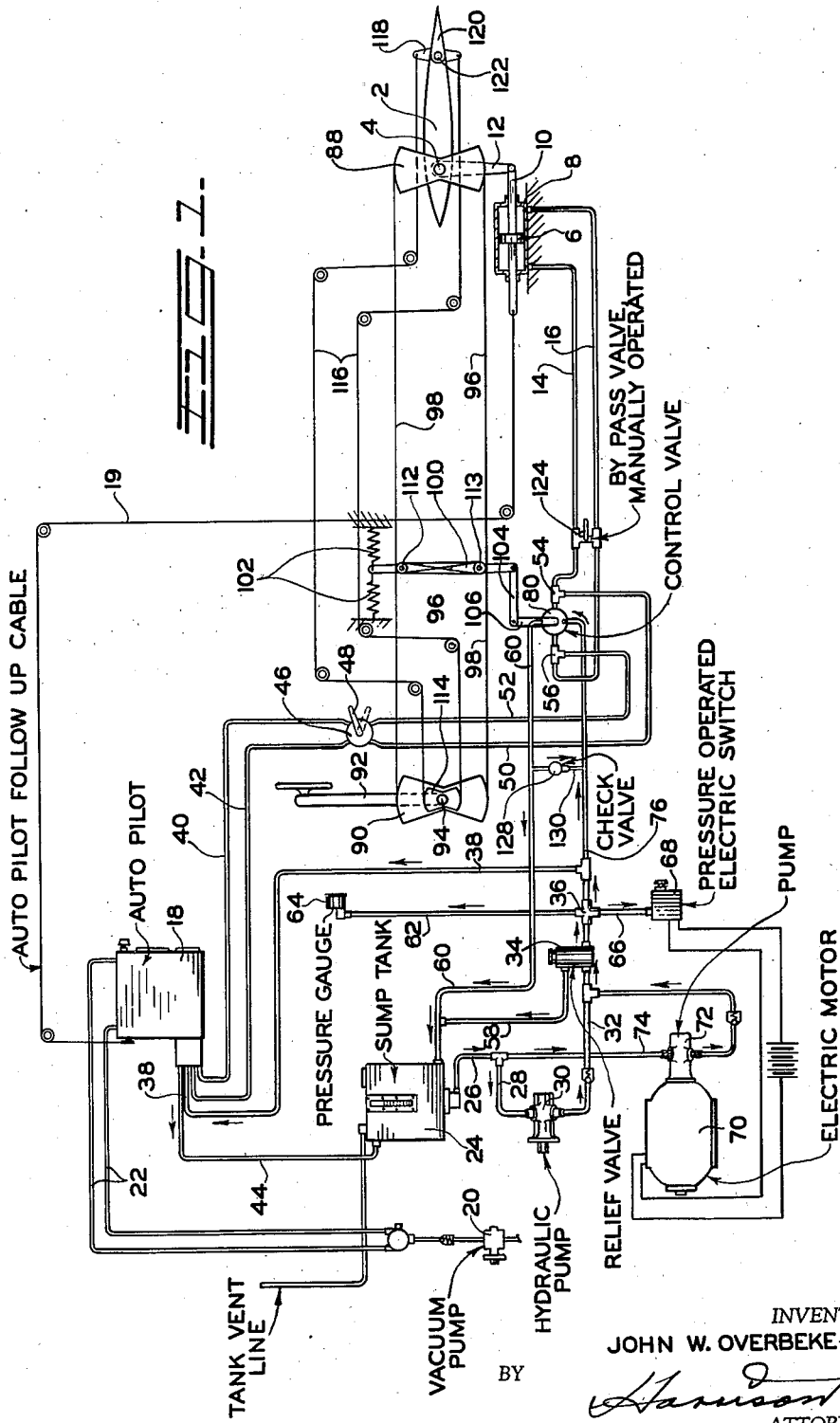

2,272,725

UNITED STATES PATENT OFFICE 2,272,725

CONTROL OF AIRCRAFT SURFACES

John W. Overbeke, Anneslie, Md., assignor to The Glenn L. Martin Company, Baltimore, Md.

Application July 13, 1939, Serial No. 284,276

14 Claims. (Cl. 244—78)

The invention relates to the control of aircraft surfaces, and more particularly to a combined automatic and manual control therefor.

The object of the invention is to provide a simple and effective mechanism for controlling the surfaces of aircraft which utilizes manual operation and automatic operation as desired.

A second object of the invention is to provide an automatic controlling mechanism for aircraft surfaces combined with a manual control which, when operated, automatically renders the automatic control mechanism ineffective.

A further object of the invention is to provide a control mechanism having a novel and useful type of follow-up mechanism.

Still another object is to provide a power operated and manually controlled mechanism for moving aircraft surfaces, with follow-up mechanism therefor.

A further object of the invention is to provide a single control member which operates a power mechanism for moving the control surface and also operates a vane on the control surface for varying the position thereof when the power mechanism is inoperative.

Further objects and advantages of the invention will appear more fully from the following description, particularly when taken in conjunction with the accompanying drawings which form a part thereof.

In the drawings:

Fig. 1 shows generally diagrammatically a system embodying the invention;

Fig. 2 is a detail side elevation of the valve and follow-up mechanism; and

Fig. 3 is a cross section substantially on the line 3—3 of Fig. 2.

As shown in the drawings, the invention is applied to the control of an aircraft surface 2 hinged to turn about an axis 4. This surface may be any desired movable surface of the aircraft, as, for example, the elevator, the rudder or the aileron.

The power operation of the control surface is produced by a piston 6 slidable in the cylinder 8 and having a piston rod 10 connected at one end to a lever 12 rigid with the surface 2. Fluid is supplied to opposite ends of the cylinder 8, or to opposite sides of the piston 6, through pipes 14 and 16.

The mechanism here shown may be operated entirely automatically as, for example, by an automatic pilot mechanism such as the conventional Sperry auto-pilot, indicated at 18. This contains a gyroscope which is operated by a vacuum pump 20 through pipes 22, this being the conventional type of mechanism. Fluid is supplied for operating the piston 6 from a tank 24 through pipes 26 and 28 to pump 30. From pump 30 the fluid flows through pipe 32 to a relief valve 34 and thence through cross 36 to pipe 38 which leads into the auto-pilot. A valve within the auto-pilot, operated by the mechanism thereof, controls the flow of fluid from pipe 38 to one of two pipes 40 and 42. At the same time, the other pipe, to which fluid is not supplied from pipe 38, is connected to a pipe 44 leading back to the tank 24. Pipes 40 and 42 are controlled by a single valve 46 operated by a handle 48 so as to open or close the connection between pipes 40, 42 and pipes 50, 52, respectively. Pipes 50 and 52 lead respectively to T's 54 and 56 in pipes 14 and 16, respectively.

A follow-up cable 19 connected to piston 6 is provided for resetting the auto-pilot valve to zero when the surface 2 reaches a position corresponding to that required by the movement of the auto-pilot valve.

Relief valve 34 is connected by a by-pass line 58 to a line 60 leading into the tank 24. One of the arms of the cross 36 leads to a pipe 62 connected to a pressure gauge 64 for indicating the pressure in the line. The opposite arm of cross 36 leads to a pipe 66 connected to a pressure operated electric switch 68. This switch is arranged to close when the pressure drops below a predetermined amount and thus to energize an electric motor 70 to drive a pump 72 located in a line 74 which is shunted across the main pump 30. Thus, if the main pump fails, the electric pump is automatically brought into operation.

Also connected to pipe 38 is a pipe 76 leading to the inlet port 78 of the control valve 80. Ports 82 and 84 of valve 80 are connected to pipes 14 and 16 respectively. Outlet port 86 of valve 80 is connected through pipe 60 to the tank 24. The valve has a semi-cylindrical movable member 108 provided in the face overlying outlet 86 with a groove 109 for connecting orifices 82 or 84 to outlet 86. Inlet 78 is never covered, and when one of orifices 82, 84 is uncovered communication is established between such orifice and the inlet.

Rigid with the surface 2 to be controlled is a double quadrant member 88. A second double quadrant member 90 is rigid with the control lever 92 which is pivoted at 94. Cables 96 and 98 connect the quadrants 88 and 90. These cables pass over the valve control and a follow-up lever formed of spaced bars 100 pivoted at 101. This lever is mounted at one end between centering springs 102, and at its other end is pivoted by pin 103 to a link 104 connected to an arm 106 which is rigid with the movable member 108 of the valve 80. The cables 96 and 98 pass around pulleys 110, 111, 112 and 113 mounted freely on pins 115 carried by bars 100, and thus cross each other, as indicated more clearly in Figs. 2 and 3.

Rigid with lever 92 is a double quadrant 114 which is connected by cables 116 passing over suitable pulleys to the ends of a lever 118 rigid with a tab or flap 120 mounted to pivot at 122 on the main movable surface 2.

Between the lines 14 and 16 is a manually operated by-pass valve 124 by which these lines can be connected at will.

The operation of this mechanism is as follows:

Assuming first that the device is being operated automatically, as for example to keep the aircraft flying at a certain level, the auto-pilot 18 is set for this level flight. If the plane tends to tilt away from the level, for example to dip forward, the auto-pilot, since valve 46 is in automatic control position, will supply fluid through pipe 42, T 54, pipe 14 to the left hand side of cylinder 8 and thus will tend to raise the elevator 2. This will, of course, tend to bring the nose of the plane up to level. When the proper position of elevator is reached, the auto-pilot follow-up cable 19 will cause the stopping of the auto-pilot mechanism and will thus hold the elevator in the necessary position.

When the elevator rises, since the lever 100 is stationary, the cable 96 will be pulled and the cable 98 will be released. The different movements of these cables will cause the control lever 92 to tilt backwards to a position corresponding to the position of the elevator, so that the parts are kept in their corresponding positions during this automatic operation.

Assuming now that the auto-pilot is operating, but that the pilot wishes to cause the aircraft to rise above its level position. The present invention makes it possible to do this without cutting off the auto-pilot. If the parts were in neutral position as shown by the drawings, the pilot merely pulls back on the lever 92. This tightens the cable 98 and relieves the tension on the cable 96. The effect of this movement is to exert a substantial pull on the pulley 113 towards the front or left-hand side of Fig. 1 and on the pulley 110 towards the rear. This tilts the lever 100 clockwise, and shifts the movable member 108 of the control valve 80 counterclockwise. Fluid then flows from the pump through pipe 76 and outlet 82 to the pipe 14 and to the left-hand side of piston 6. This tends to raise the elevator 2, and thus exerts force on the follow-up cable 19 of the auto-pilot. The start of flow to the cylinder for moving the elevator up will thus cause the gyrostat in the auto-pilot to react through its own valve in such a direction as to tend to move the elevator down, or to supply fluid to line 40. Fluid will then flow from line 40 through T 56 to valve 80 and through inlet 84 to return passage 86, while fluid will also flow from pipe 76 and inlet 78 to outlet 82, T 54, and pipe 42 whence it will return through the auto-pilot valve to the tank 24. In other words, the power side of each of the two controls of the automatic control and the manual control, respectively, is connected to the return pipe of the other control system.

Under these circumstances, the elevator is nevertheless operated. Pulling back on the lever 92 turns the flap 120 downwardly, which by its retarding effect tends to turn the whole elevator 2 upwardly and thus moves it to the desired position.

When manual power control only is desired, valve 46 is closed, thus shutting off the action of the auto-pilot. If now lever 92 is moved forward, it will tighten cable 96 and relieve cable 98, thus causing lever 100 to turn counterclockwise. This will turn valve member 108 clockwise, and will connect inlet 78 to pipe 16 and outlet 86 to pipe 14. Pressure fluid will then be supplied to the right-hand side of piston 6 and will turn the surface 2 downward.

As the elevator 2 moves downward, it increases the tension on the cable 98 and reduces the tension on cable 96, thus exerting an opposite effect on the lever 100 and gradually restoring it to its neutral or vertical position. When the elevator 2 reaches a position corresponding to that of the lever 92, the lever 100 is restored to its neutral position and closes valve 80 so that no further movement of the elevator occurs.

If the pumps should break down, or if, for any other reason, the pressure in the whole system should fail, it is still possible for the pilot to manipulate the elevator by the movement of the flap 120 as has just been described, the operation being the same as when both the manual and auto-pilot controls are in full operation and therefore neutralize each other. The usual effect of the failure of the pumps is to create a suction in the lines such as 76 and this is relieved by a check valve 128 located in a shunt line 130 connecting the pipes 76 and 60. Furthermore, if the hydraulic system still tends to lock the elevator against movement, the lock may be released by opening the by-pass 124 and thus connecting pipes 14 and 16.

While I have described herein one embodiment of my invention, I wish it to be understood that I do not intend to limit myself thereby except within the scope of the appended claims.

I claim:

1. In a control mechanism for aircraft, a control surface pivoted on the aircraft, a cylinder, a piston movable in said cylinder and connected to said control surface, a valve, means connecting said valve to opposite sides of said cylinder, an auto-pilot, means connected to said cylinder and controlled by said auto-pilot to supply fluid under pressure to said cylinder, a manual control member, and a follow-up means connected to said valve between said manual control member and said control surface for controlling the position of said valve, whereby, when said control member is moved, the action of said auto-pilot is neutralized.

2. In a control mechanism for aircraft, a control surface pivoted on the aircraft, a cylinder, a piston movable in said cylinder and connected to said control surface, a valve, means connecting said valve to opposite sides of said cylinder, an auto-pilot, means to supply fluid under pressure to said auto-pilot, means controlled by said auto-pilot to supply fluid under pressure to said connecting means, means to supply fluid under pressure to said valve, a manual control member, a follow-up means between said control member and said control surface for controlling the position of said valve, whereby, when said control member is moved, the action of said auto-pilot is neutralized, and means independent of said piston to move said control surface upon movement of said control member when the action of the auto-pilot is neutralized.

3. In a control mechanism for aircraft, a control surface pivoted on the aircraft, a cylinder, a piston movable in said cylinder and connected to said control surface, a valve, means connecting said valve to opposite sides of said cylinder, an auto-pilot, means to supply fluid under pressure to said auto-pilot, means controlled by said auto-pilot to supply fluid under pressure to said connecting means, means to supply fluid under pressure to said valve, a manual control member, a follow-up means between said control member and said control surface for controlling the position of said valve, whereby, when said control member is moved, the action of said auto-pilot is neutralized, a vane pivoted on said control surface, and means independent of said piston connecting said control member to said vane to move said vane upon movement of said control member.

4. In a device for controlling the surfaces of aircraft, a surface pivoted on the aircraft to turn with respect thereto, a manual control member pivoted on the aircraft, a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot.

5. In a device for controlling the surfaces of aircraft, a surface pivoted on the aircraft to turn with respect thereto, a manual control member pivoted on the aircraft, said control surface and said control member each having portions extending on opposite sides of their pivots, a lever pivoted between said control surface and control member, pairs of pulleys mounted on said lever on opposite sides of its pivot for free rotation with respect thereto, cables connected to the portions of said control member on opposite sides of its pivot, each of said cables extending over one of the pulleys of each pair and said cables crossing each other at said lever, said cables being connected to portions of said control surface on opposite sides of its pivot and oppositely to their connections to said control member.

6. In a device for controlling the surfaces of aircraft, a surface pivoted on the aircraft to turn with respect thereto, a manual control member pivoted on the aircraft, a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot, a vane pivoted on said control surface, and cables connected to said vane on opposite sides of its pivot and to said control member on opposite sides of its pivot.

7. In a device for controlling the surfaces of aircraft, a surface pivoted on the aircraft to turn with respect thereto, a manual control member pivoted on the aircraft, said control surface and said control member each having portions extending on opposite sides of their pivots, a lever pivoted between said control surface and control member, pairs of pulleys mounted on said lever on opposite sides of its pivot for free rotation with respect thereto, cables connected to the portions of said control member on opposite sides of its pivot, each of said cables extending over one of the pulleys of each pair and said cables crossing each other at said lever, said cables being connected to the portions of said control surface on opposite sides of its pivot and oppositely to their connections to said control member, a vane pivoted on said control surface, and cables connected to said vane on opposite sides of its pivot and to said control member on opposite sides of its pivot.

8. In a device for controlling the surfaces of aircraft, a surface pivoted on the aircraft to turn with respect thereto, a manual control member pivoted on the aircraft, a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot, power means connected to said control surface, means for controlling the supply of power to said power means, and means connecting said control means to said lever whereby movement of said lever moves said control means.

9. In a device for controlling the surfaces of aircraft, a surface pivoted on the aircraft to turn with respect thereto, a manual control member pivoted on the aircraft, a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot, a piston connected to said control surface, a valve for controlling the supply of fluid to said piston, means to supply fluid under pressure to said valve, and means connecting said valve to said lever whereby movement of said lever moves said valve.

10. In a device for controlling the surfaces of aircraft, a surface pivoted on the aircraft to turn with respect thereto, a manual control member pivoted on the aircraft, a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot, power means connected to said control surface, means to control the supply of power to said power means, means connecting said control means to said lever, a vane pivoted on said control surface, and cables connected to said vane on opposite sides of its pivot and to said control member on opposite sides of its pivot.

11. In a control mechanism for aircraft, a control surface pivoted on the aircraft, power means connected to said control surface to move the same, control means for said power means, an auto-pilot, means connecting said auto-pilot to said control means, a manual control member, a follow-up means between said control member and said control surface for controlling the position of said control means, whereby, when said control member is moved, the action of said auto-pilot is neutralized, and means independent of said power means connected to said control member to move said control surface upon movement of said control member.

12. In a device as claimed in claim 11 for controlling the surfaces of aircraft, said follow-up device comprising a lever pivoted between said control surface and control member, pairs of pulleys mounted on said lever for free rotation with respect thereto, cables connected to said control member on opposite sides of its pivot, each of said cables extending over one of the pulleys of each pair and said cables crossing each other at said lever, said cables being connected to said control surface on opposite sides of its pivot, and means connecting said lever to said control means.

13. In a control means for a pivoted aircraft surface, power means to move said surface, manual control means, a follow-up means between said manual control means and said surface, means connected to said follow-up means to control said power means, automatic means to control said power means, means operable upon the combined operation of said manual and automatic means to neutralize the effect of both said manual and automatic means on said power means, and means independent of said power means and operatively connected to said manual control means to move said surface in response to movement of said manual control means when said neutralizing means is effective.

14. In a control mechanism for aircraft, a control surface pivoted on the aircraft, a cylinder, a piston movable in said cylinder and connected to said control surface, automatic control means, a valve having two orifices, a pair of conduits connecting said orifices to opposite sides of said cylinder, a second pair of conduits connecting said automatic control means to the conduits of said first pair, means to supply fluid under pressure to said automatic control means, means to discharge fluid from said automatic control means, said automatic control means connecting said last two means selectively to the conduits of said second pair, a third orifice in said valve, means to supply fluid under pressure to said third orifice, a discharge orifice from said valve, a movable valve member for selectively connecting said first two orifices to said third orifice and said discharge orifice respectively, a manual control member, a follow-up means connecting said manual control member and said control surface, means connecting said follow-up means to said movable valve member, a second follow-up means between said automatic control means and said control surface, whereby, when said manual control member is moved in such a direction as to move said first follow-up means to connect one of said first two orifices to said third orifice, said second follow-up means causes said automatic control means to connect the conduit of the second pair corresponding to such orifices to said first discharge means, whereby to neutralize the effect of said pressure fluid supply means on the piston, a vane pivoted on said control surface, and means connecting said manual control member to said vane to move the same.

JOHN W. OVERBEKE.